Sept. 16, 1941.  R. E. BRANDON  2,255,965
VIBRATORY SHUT-OFF VALVE
Filed Dec. 13, 1937  4 Sheets-Sheet 1

Inventor
RICHARD E. BRANDON
By Hazard and Miller
Attorneys

Sept. 16, 1941.                R. E. BRANDON                2,255,965
                            VIBRATORY SHUT-OFF VALVE
                             Filed Dec. 13, 1937            4 Sheets-Sheet 3

Inventor
RICHARD E. BRANDON
By Hazard and Miller
Attorneys

Patented Sept. 16, 1941

2,255,965

UNITED STATES PATENT OFFICE 2,255,965

VIBRATORY SHUT-OFF VALVE

Richard E. Brandon, Los Angeles, Calif.; A. H. Brandon, guardian of Richard E. Brandon, a minor, assignor, by mesne assignments, to George Pepperdine Foundation, a corporation of California Application December 13, 1937, Serial No. 179,509

9 Claims. (Cl. 137—139)

I designate my invention as a vibratory shut-off valve as it pertains to a type of valve or valve control in which vibration displaces one or more elements either permitting or controlling the closure of a valve. My invention pertains particularly to a type of vibratory shut-off for valves designed especially to react to earthquake shocks or those of a similar nature so that gas pipes or the like may be shut off and hence remove an additional danger of fire through the disruption of gas or like surface by an earthquake.

There have been a number of types of valves designed and patents issued in which these are intended to be responsive to earthquake shocks or the like. However with a number of these they are too delicate and may operate by vibrations not caused by earthquakes and which would do no harm to building constructions. Then again some of the shut-off valves adapted for earthquake use are too expensive and others when inactive for a long period of time will not respond to the earthquake vibrations.

Among the various features of my invention is a vibratory shut-off for a valve in which a certain dampening action is obtained so that minor vibrations will not cause the closure of the valve. Another feature of my invention is in the employment of a vibratory weight mounted in the manner of a pendulum. Such may be an inverted pendulum, the weight for instance being supported and mounted on a fine rod or wire with the weight above the supporting structure for the wire or the construction may involve a suspended pendulum. Another characteristic of my invention in the pendulum type is in a construction by which the pendulum itself forms an active element to hold a valve open by for instance the valve stem engaging part of the pendulum. Then when the pendulum is displaced the stem may drop by gravity or move under the action of a spring and cause closure of a valve. This construction has the characteristics of the contact between a valve stem and the pendulum producing a dampening effect and thereby restraining the operation of the vibratory weight when subjected to vibrations other than earthquakes severe enough to do material damage.

Another object and feature of my invention is in mounting the vibratory weight on a column or the like, the column having a small base and thereby a vibratory movement developed in the weight due to an earthquake or the like and caused by the inertia of the weight will produce a tilt of the base of the column on its support. In one form of my construction the weight and the column may tilt entirely off of the base. In another form the column may be supported on a diaphragm and thus cause a deflection of such diaphragm.

Another feature of my invention involves the action of the displaced weight mounted on a column in having the tilting or shifting of the column cause the breakage of a frangible element. In one case this frangible element may be a rod such as a glass rod holding a valve plug in its open position and such plug being urged to a closed position on the breaking of the rod either by a spring or gravity. In such case the displacement or inclination of the column in reference to the glass or other frangible rod causes a breaking of such rod. In another form of my invention the rod may be a hollow tube closed at one end with gas or the like admitted at a fixed open end. In this construction the displacement of the weight mounted on the column may cause a breaking of the glass tube and thus develop a flow of gas. This gas flow may then be utilized as a remote control for a gas operated valve such as a diaphragm type of valve.

Considered in more detail in the construction using the weight mounted on the column, in one form the column is supported on a small circular base, this base having an opening for a glass or similar tube to extend therethrough with a clamp connecting the tube and the base. By this means the glass rod may support the stem of a valve. The tilting of the column then causes a breaking of the rod and thus severing the structure restraining the valve plug in its open position.

In the diaphragm type of supported column and weight it is preferable that the diaphragm form one side of a chamber through which the gas may flow. In such case the frangible glass tube extends into such chamber and has its closed end fitting in a downwardly projecting socket from the diaphragm. Therefore when the diaphragm is distorted due to the tilting of the column, the glass tube is broken allowing the flow of gas.

A characteristic feature of my invention in employing the weight supported on a column is that the supporting structure develops a damping action as to slight vibrations and the weight may be adjusted vertically on the column and thus made responsive to various amplitude of earth waves.

In all forms of my invention I propose to incorporate a positive means to displace the weights so that by manual operation the weights can be shifted and thus cause the closing of the valves or the operation of the gas flow independent of any earth shock or the like. Such construction includes a remote control or actuating device so that the weight and hence the valves may be operated from a distance. This feature of my invention has an important element of utility in connection with gas supplies to buildings or the like whereby in the case of fire the gas may be shut off at the control valve.

In another form of my invention I employ a tri-filar pendulum in which a heavy weight is suspended by three pendulum wires and therefore has mainly a horizontal motion due to its inertia when the supporting structure is subject to an earth or similar shock. In this construction a valve stem or the like may be supported on a stud positioned axially on the pendulum and extending upwardly, then on the displacement of the pendulum weight and this stud the valve stem may drop by gravity.

An advantage of this tri-filar construction is that it does not tilt or rock materially as compared to the action of the inverted pendulum but executes mainly a transitory and horizontal motion. The friction of the contact areas of the stud and stem or similar setting pins exercises a beneficial action on the dynamic behavior of the pendulum inasmuch as it reduces the sensitivity of the pendulum and hence the devices controlled thereby to ground motions of the same frequency as the natural period of vibration of the tri-filar pendulum. If there were no friction at the contact areas of the setting studs or pins the valves or other device held inactive by the pendulum would be abnormally sensitive to ground motions.

My invention also comprehends other uses of a pendulum displaced by earthquake or similar shocks. For instance such pendulum construction may be used to open and/or close an electric circuit or circuits. These may be relay circuits and operate some mechanism under control of a relay action. In another construction the arrangement may be a mechanical release so that on displacement of the pendulum a mechanical device is actuated which may be used for the actuation or control of many different types of mechanism.

The term tri-filar is a technical term used to describe suspensions and means suspension by three strings. The strings may or may not be equi-distant. Theoretically the string has a negligible resistance towards bending. As presented in this invention the tri-filar strings or fine wires are spaced equi-distant and are also of equal length. Therefore in an oscillating movement of the pendulum the smooth contact friction surface is always in a horizontal plane and as the swinging is usually not of great amplitude, there is very little up and down motion of such horizontal plane, at least this is negligible in the arc of swing necessary to release the two complementary contact horizontal surfaces in the tri-filar type of suspended pendulum.

My invention is illustrated in connection with the accompanying drawings, in which.

Figures 1, 2, 3, 4:
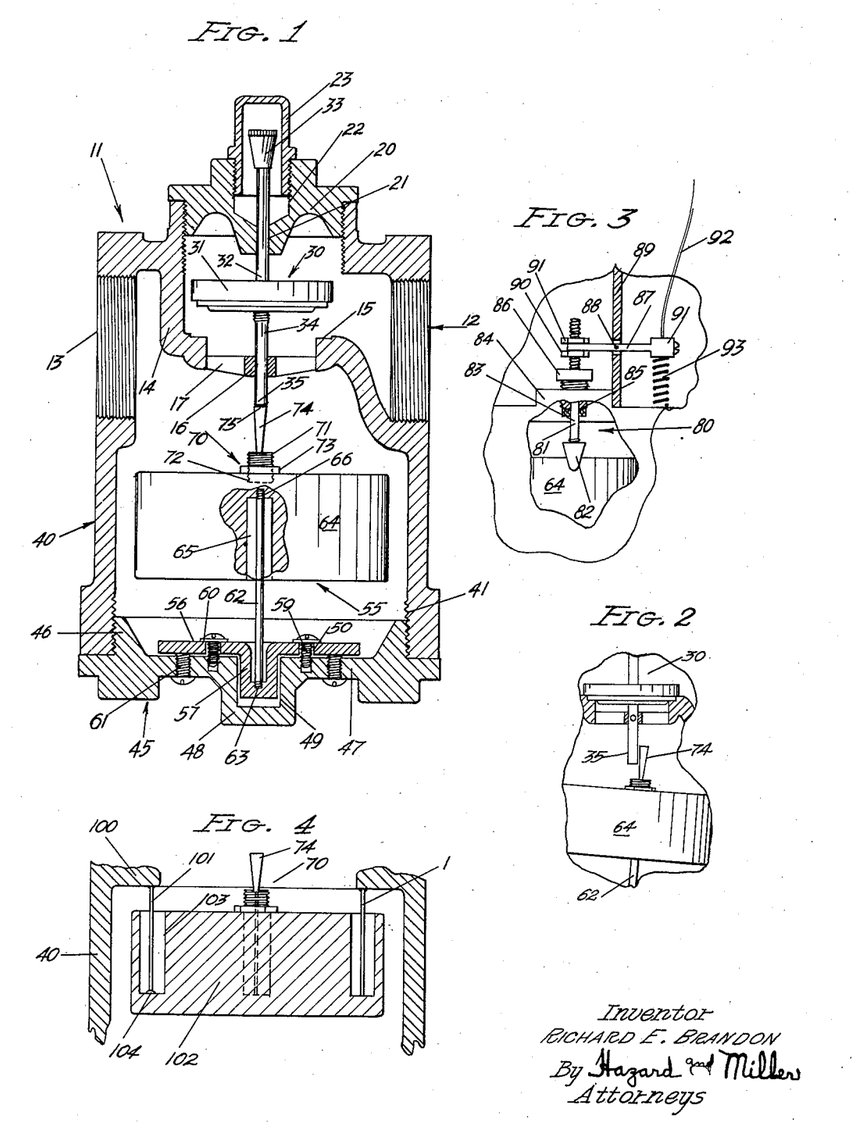
Fig. 1 is a vertical section through one type of vibratory valve in which the vibratory weight is operative to normally retain the valve stem and valve plug in the open valve position, that is, raised above the seat.
Fig. 2 is a section similar to Fig. 1 of part of the valve showing the weight displaced and the valve plug dropped to its seat.
Fig. 3 is a detail partial elevation and partial section showing a manual control to shift the weight to effect the closing of the valve.
Fig. 4 is a section of part of the valve similar to Fig. 1 of a modification in which the weight is suspended in a pendulum manner.

Referring first to the construction of Figs. 1, 2 and 3, this employs a valve housing 11 having a threaded opening 12 for inlet of gas and a threaded outlet 13. The usual diaphragm or central partition 14 of the valve has a seat 15, a central hub 16 and an open spider construction 17. A cap 20 is mounted on the upper part of the housing and has a perforation 21. A threaded recess 22 of the cap provides for a removable screw threaded cover 23, the purpose of which is defined hereunder.

The valve plug assembly 30 includes the disc-like plug 31 of the usual type having a valve stem 32 connected thereto. This stem has an upper part extending through the perforation or opening 21 of the cap and is provided with a finger grip knob 33 at the top. The lower part 34 of the stem extends downwardly through the hub 16 and has a surfaced bottom end 35. Such end is finished transverse to the axis of the stem. In this construction the plug is of the type to be seated by gravity as the stem is mounted in a vertical line.

The housing is provided with a skirt 40 which is preferably cylindrical having a full sized threaded opening 41 at the bottom. In this there is threaded a lower head 45, this being provided with an internal threaded collar section 46 engaging the threads 41, a transverse base 47, a depending structure 48 provided with a recess 49. The vibratory weight assembly 55 employs a disc-like supporting base 56 having a well 57 extending downwardly. The disc is provided with relatively large openings 58 through which extend clamping screws 59, there being a spring washer 60. Levelling screws 61 are threaded upwardly through the base 47 and engage the underside of the disc 56.

A stiff wire 62 has its lower end firmly secured in the base of the well, the connection being illustrated as screw threaded as shown at 63. There is a clearance between the wire and the inside of the well 57. The relatively heavy vibratory weight 64 is preferably a cylinder flat on the top and bottom and having a deep socket 65 extending upwardly from the bottom. The upper end of the wire 62 is secured to the weight by a screw threaded connection 66. A supporting and adjustable abutment assembly 70 has a screw threaded plug 71 threaded in a recess 72 in the top of the weight and locked in place by a lock nut 73. A stud 74 is formed integral with the plug extending upwardly and at the top this has a surfaced face 75. Such face is smooth and is truly at right angles to the axis of the wire 62, the plug and the stud 74. This engages the end 35 of the lower part 34 of the stem of the valve-plug and holds the plug in its uppermost position with the valve open.

The manner of operation and functioning of the construction of Figs. 1 and 2 is substantially as follows: The cover 23 may be removed so that the knob 33 may be grasped by the fingers to lift the plug off of the seat. By means of the adjusting screws 61 engaging the underside of the disc 56 and the clamping or tightening screws 59, this disc is properly adjusted so that the wire 62 is vertical and in alignment with the stem. The enlarged perforations 58 permit a slight shifting of the disc 56 with its well as to the base 47 of the head 45. The adjustment is made so that the upper surface 75 of the stud has an even contact with the lower surface 35 of the stem of the plug. The cover 23 is then replaced and the valve may be left in the piping assembly indefinitely and always be held open.

In the case of an earth shock such as an earthquake, this develops a bodily movement of the valve housing and the whole assembly, thence due to the inertia of the weight 64, such weight tends for a moment to remain stationary, the wire 62 flexing. If the action or vibratory force is sufficient, the weight will be shifted laterally in regard to the valve stem a sufficient amount so that the contacting surfaces between the stem and the stud ride one off the other or disengage. Then as the plug is free to drop by the action of gravity it drops downwardly on the seat 15, thus closing off the flow of gas or liquid through the valve. It will be noted in this construction that the whole of the chamber inside of the depending skirt 40 is in communication with the fluid flowing through the valve but this is immaterial so far as the action in the valve is concerned. The relative positions of the weight and its stud in reference to the valve stem is shown in Fig. 2 in which the plug is dropped and closed. An important characteristic of this type of valve and mounting of the weight is that there is a considerable friction developed between the end surface of the stem and the upper surface of the stud which is rigidly secured to the weight. This produces a damping action so that for minor vibrations such resistance develops the damping of the vibratory action of the weight and the wire 62. Hence by properly calibrating the type of wire 62 in regard to the weight 64 and the area of the frictional surface, together with the weight of the valve plug, this valve assembly may be made to resist the closing action of the valve for more or less minor vibrations or shocks but when an earth shock is sufficient to cause material damage, the displacement of the weight relative to the stem allows an immediate closing of the valve.

In many constructions it is desirable to have a manual control of the closing of the valve. For instance in case of fire if the valve is used as a gas valve, it is desirable to close the valve independent of any earth shock or vibration. Such a construction is illustrated in Fig. 3. This employs a displacing assembly 80 in which a displacing pin or rod 81 is provided at the bottom with a substantially cone shaped displacing head 82. This may be screw threaded on the pin. The pin extends upwardly through a perforation 83 in part of the wall structure 84 of the valve housing, there being provided a packing 85 and packing gland 86 to prevent leakage past the pin. At another part of the valve housing a pivoted lever arm 87 is mounted on a pivot 88 and extends preferably through an opening in a wall structure 89 of the valve housing. The inner end of this lever engages between a lower and an upper threaded washer 90, and 91, threaded on the upper end of the pin or if desired this may be a collar. The outer end of the lever preferably has a counter-balancing weight 91'. A cable 92 is connected to the outer end of the lever and may lead through a conduit to a remote control device. Such latter may be of a known type and a tension spring 93 reacting against the outer end of the lever and the fixed abutment tends to edge the pin and its conical head 82 inwardly.

The pin is normally positioned so that its head 82 clears the edge of the weight and is raised sufficiently above the top of the weight so that there will be no interference with the free movement of the weight under an earthquake or similar shock. However to actuate the valve manually the remote control device may be operated giving a pull on the wire or cable 92 which through the action of the lever forces the pin and the head 82 inwardly so that the head strikes the upper portion of the weight at one side and thus bodily displaces the weight 64, flexing the wire 62. This displacement is sufficient to disengage the bearing surface 75 of the stud 74 from the lower end 35 of the stem of the plug and hence allow the plug to seat by gravity. This therefore shuts off the gas or other fluid by a manual control which may be remote from the valve. It will be noted that to reseat the valve it is only necessary to remove the cover 23 and if the remote control device has been used, to retract this, the wire 62 being of highly resilient material will immediately spring back to its correct vertical position.

In Fig. 4 I illustrate a modification of the construction of Figs. 1 and 2. In this construction the skirt 40 depending from the main part of the sleeve has inward projections 100 with suspending wires 101 depending therefrom and supporting the weight 102. Such weight is preferably cylindrical on its outside surface and has a plurality of relatively deep recesses 103, the suspension wires extending into these recesses and being attached as indicated at 104 to the bottom.

It is necessary to have at least three suspension wires in order to support the weight and maintain this accidental tipping or tilting. The suspension wires of course should be placed symmetrical to the weight. The adjustable abutment assembly 70 is mounted in the top of the weight the same as illustrated in connection with Fig. 1. In this case the wires are carefully adjusted as to the valve to suspend the weight so that the studs 74 will be vertical and engage the lower end 35 of the stem 32. A sufficient friction is developed to give a damping action to any side sway or movement of the weight. The weight due to its inertia is however subject to vibrations imparted to the valve assembly as a whole, such as by earthquake action. Manifestly on account of the weight being suspended, any oscillating motion produced tends to raise the top of the stud very slightly. This gives a slight increased friction between the stud and the lower end of the plug stem, thereby slightly increasing the damping action but on account of the multiple point suspension, the upper surface of the stud remains truly horizontal provided of course the assembly is not entirely thrown out of place by an earthquake. When the shock is of sufficient severity the weight is displaced laterally to such an extent that the complementary surfaces of the stud and the valve stem disengage, thus allowing the stem and the plug to drop and close the valve. The weight will then be held slightly displaced. It is obvious that the weight may be manually displaced by the structure of Fig. 3 or an equivalent device and thus the valve may be manually released to close.

Figures 5, 6, 7:
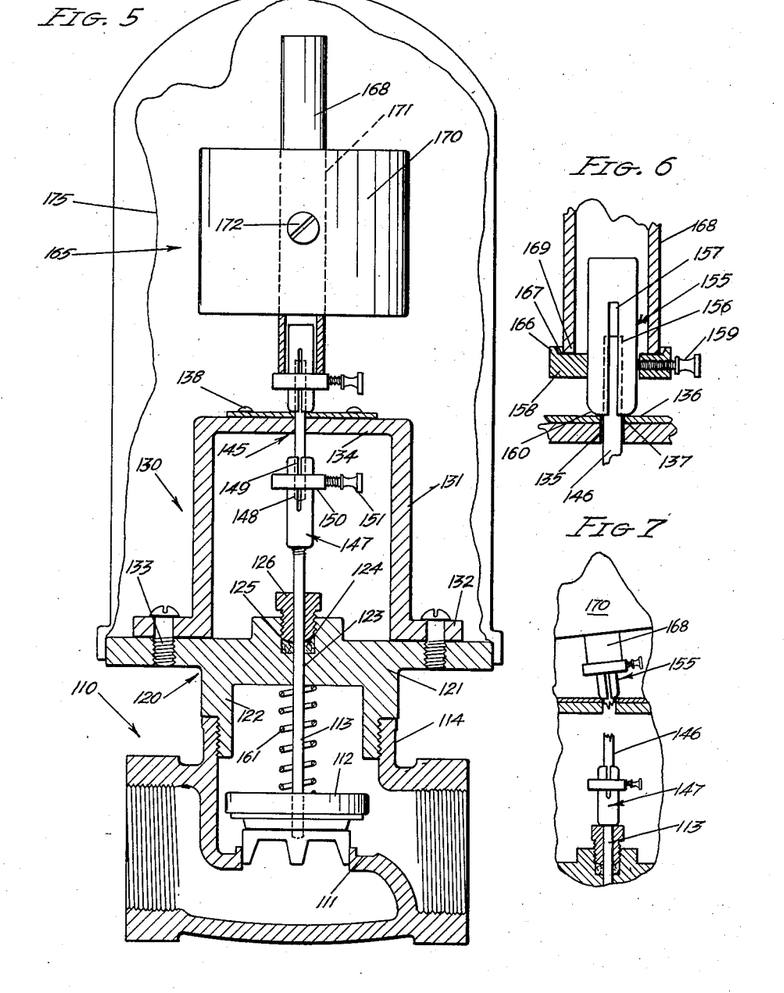
Fig. 5 is a vertical section of another form of valve in which the valve plug is suspended or held in the open valve position by a frangible rod together with the vibratory weight mounted on a column and supported on a base.
Fig. 6 is a detail in section of part of Fig. 5 showing the manner of clamping the frangible rod to suspend the valve plug.
Fig. 7 is a section of part of the valve of Fig. 5 illustrating the action of breaking the frangible rod to permit closing of the valve.

In Figs. 5, 6 and 7 I illustrate a modified construction in which the valve plug is held in its open valve position by a frangible rod or the like. In this construction the valve proper is indicated by the numeral 110. This has the usual valve seat 111 and the valve plug 112 to coact therewith. A valve stem 113 is connected with the plug and extends upwardly. The housing of the valve is provided with an upwardly extending neck 114. A valve cover head assembly 120 includes a head plate 121 with a dependent skirt 122 having a threaded or similar connection to the neck of the valve and is provided with a guide opening 123 for the valve stem. A recess 124 accommodates resilient packing 125 and a packing gland 126 to produce a leak-tight packing for the valve stem. A supporting case or frame 130 has a peripheral wall 131 or this may be an open frame structure if desired with flanges or feet 132 secured to the head plate 121 by bolts 133. This support has an upper supporting head 134 with a perforation 135 therethrough and above this there is a contact plate 136 also having an opening 137, the contact plate being positioned and retained in place by screws 138.

The frangible rod assembly 145 includes preferably a glass rod 146 secured to the stem 113 by a lower clamp 147. This clamp is shown as threaded on the stem having a socket 148 with longitudinal slits 149. A clamping collar 150 with a set screw 151 attaches the lower end of the glass rod in this clamp. The rod extends upwardly through the openings 135 and 137 and to its upper end there is attached an upper clamp 155. This has a similar socket or recess 156, longitudinal slots 157 and a clamping collar 158 with a set screw 159 extending therethrough and springing the slitted clamp together to firmly engage the rod. The lower end of this clamp preferably has a convexly curved end 160 so that only a small area rests on the contact plate 136. The glass rod thus forms a suspension element for retaining the valve stem and the valve plug in its upper position. In this structure a compression spring 161 is illustrated normally urging the plug to its closed position, however the plug may be left for an indefinite time in the open valve position suspended by the glass rod. There is sufficient clearance in the openings 135 and 137 for a slight movement of the rod and it is not necessary to have the supporting structure 130 air or gas tight.

The vibratory weight assembly 165 includes the collar 158. This is provided with a rim 166 and an upper supporting surface 167 which is accurately made to be a plane and to be connected to the glass rod at right angles to the axis of such rod. A tubular column 168 has its lower end 169 supported on the surface 167. This end is cut transverse to the axis of the column. The vibratory weight 170 which is preferably cylindrical on its peripheral surface has a bore 171 therethrough to accommodate an up and down adjustment of the weight. The weight is then secured to the column by a set screw 172. This set screw is preferably recessed and after being secured in the proper position on the column, the head is preferably covered in with metal. The weight of the set screw should be substantially equivalent to the weight of the metal removed from the weight to provide the set screw opening. If not counter-balancing weights should be added to the vibratory weight so this will be evenly balanced on the column. The axis of the column should be in alignment with the center of gravity of the weight.

In the operation of this construction it will be seen that the valve plug through the medium of its stem and the glass rod is held in an open valve position, the entire support being by the glass rod. The upper clamp 155 extends upwardly in the tubular column 168 and this clamp has the clamp collar which forms the base support for the column and the vibratory weight. The center of gravity of this assembly is therefore a considerable distance above the bottom of the column and therefore this is in unstable equilibrium. However the area or diameter of the contact between the column and the supporting collar is such that the weight is not readily displaced by minor vibrations. There is in effect a certain damping action in the contact of the column and the collar. However should the earth shock be sufficient, the inertia of the weight causes a relative displacement, the weight and column tilting as shown in Fig. 7. The column in this tilt contacts and engages the upper clamp and forces such clamp to tilt with the column. This introduces bending stresses in the glass rod and causes a breaking of such rod. The break usually occurs substantially at the openings 135 or 137 in the structure supporting the glass rod. Manifestly when the rod is broken the valve plug is free to close on its seat being urged in closed position by the spring 161. In order to catch the weight when tilted a sufficient amount to open the valve I provide a cover cap 175. This is shown as supported on the head assembly 120 and forming a complete cover and enclosure for the vibratory weight assembly and the supporting structure 130. This however does not need to be air or gas tight. It will be noted that there is a clearance between the clamp 155 and the inside of the column 168 so that the column and the weight may have quite an appreciable tilt before the column engages the clamp. Therefore when the tilt is sufficient and the column is toppled off its support, a considerable blow is delivered to the clamp. This gives a sudden stress on the glass rod facilitating the breaking.

Figures 8, 9, 14, 15:
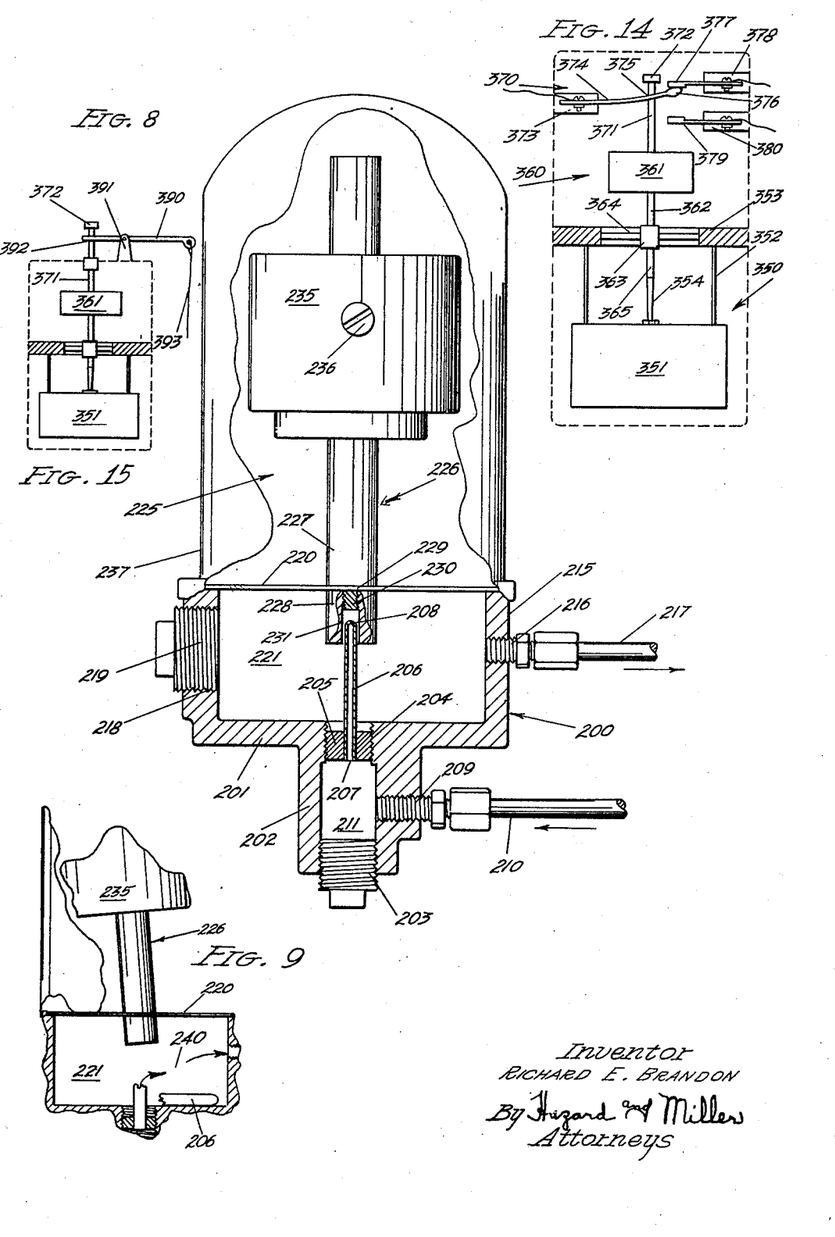
Fig. 8 is a vertical section through a third type of valve in which the vibratory weight is mounted on a column, the latter supported by a diaphragm forming part of the valve chamber, this being of a type to open a passage for the flow of a gas or if desired, liquid.
Fig. 9 is a section similar to part of Fig. 8 showing the column and weight tilted and the frangible tube broken to develop the flow of gas or liquid.
Fig. 14 is a diagram in elevation in partial section illustrating the displaceable pendulum to control an electric circuit opener and/or circuit closer, this being illustrated with a tri-filar pendulum.
Fig. 15 is a diagram somewhat similar to Fig. 14 showing a mechanical device operated by the pendulum displacement.

In Figs. 8 and 9 I illustrate another form of a vibratory shutoff for a fluid. In this construction I provide a chamber structure 200 having a bottom 201 with a depending neck 202. This neck has a bottom stopper 203 threaded therein and at the upper threaded end 204 there is a tubular plug 205 to which is secured a refrangible tube 206 which is preferably made of glass, open at the lower end 207 and sealed at the upper end 208. A connector 209 is provided for coupling a gas supply tube or pipe 210, thus leading gas to the compartment 211 inside of the neck and the glass tube 206.

The chamber structure 200 has a peripheral wall 215 with an outlet connection 216 and an outlet gas tube 217 connected thereto. A large threaded opening 218 is provided with a large closure plug 219 preferably of sufficient size for insertion of a person's hand or suitable tools. A thin diaphragm 220 forms the top closure for the chamber structure 200 making a closure for the space 221 defined by the base 201, the peripheral wall 200 and the diaphragm.

The vibratory weight assembly 225 includes a column 226. This has an upper part 227 and a lower nut section 228 on opposite sides of the diaphragm. The diaphragm has an opening 229 through which extends a threaded pin 230 forming part of the upper section of the column. This is threaded to the nut section 228 and thus securely attaches the column to the diaphragm. The column has a cylindrical recess 231 on the lower portion 228 in which the upper and sealed end of the tube 206 is fitted. The weight 235 is slidably mounted on the upper part 227 of the column and clamped thereto by a set screw 236, this attachment being of a construction which maintains the proper balance of the weight so that the center of gravity of the weight is in alignment with the axis of the column. An enclosure cover 237 is attached to the upper part of the peripheral wall 215 and completely encloses the weight, the upper part of the column and the diaphragm 220.

The mode of action and the functioning of the construction of Fig. 8 is substantially as follows: The supply pipe or tube 210 is always connected to a source of gas supply. This may be drawn from a main or the like entering a building, therefore the compartment 211 and the sealed tube is always filled with gas. It is not necessary to have a leak tight connection of the diaphragm to the wall 215 or of the cover to this wall so that there may be a slight air leakage if desired through the opening 229. However as the outlet pipe 217 is intended for connection to a diaphragm controlled valve, the pressure in the chamber 221 may be substantially atmospheric pressure or equal to the pressure in the diaphragm valve which is to control the gas main.

The diaphragm is of sufficient stiffness so that the column 226 is normally held in a vertical position but the column is in unstable equilibrium with the heavy weight being above the position of support. However the diaphragm has sufficient resistance to flexing to damp slight vibrations of the weight and column which may be due to minor earth movements, of the valve assembly. However if the shock is sufficient the inertia of the weight causes a flexing of the diaphragm and therefore a tilting of the column. This causes the walls of the recess 231 to forcibly engage the upper and sealed portion of the tube 206 causing a break in such tube. As soon as this tube is broken the gas may flow from the supply pipe 210 through the chamber 221 following the flow path indicated by the arrows 240 of Fig. 9. The gas then is conveyed by the outlet pipe 217 and may be taken to any type of diaphragm or gas controlled valve and shut off the gas at the main between the connection of the supply pipe 210 and the distribution service of the diaphragm controlled valve. This construction of Fig. 8 thus provides what might be termed a remote control earthquake reacting valve which opens a supply which has a secondary action of shutting off some other valve.

Figures 10, 11, 12:
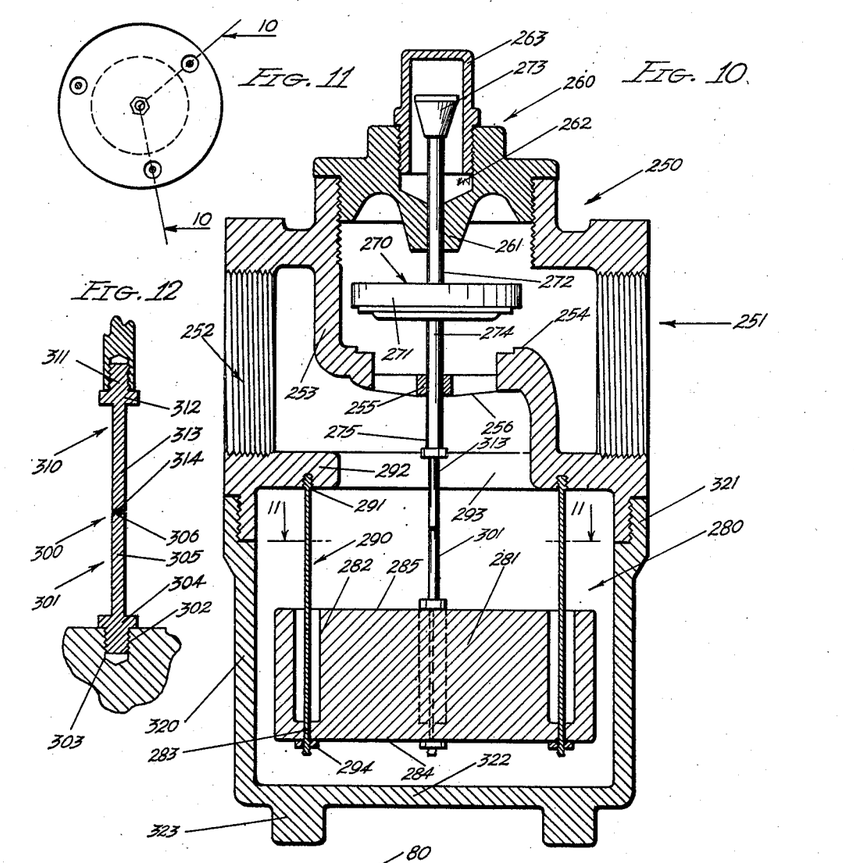
Fig. 10 is an irregular longitudinal section of a complete valve with the suspended vibratory weight illustrated as taken on the section line 10—10 of Fig. 11 in the direction of the arrows.
Fig. 11 is a horizontal section on the line 11—11 of Fig. 10 showing the suspended weight only.
Fig. 12 is an enlarged vertical section of the contact stem and studs.

In Fig. 10 the valve housing 250 has the inlet 251 and an outlet 252 for gas. It is provided with a central partition 253, a valve seat 254, such seat having a central hub 255 and an open spider construction 256. A cap 260 has a perforation 261 extending downwardly from a screw threaded recess 262. In this recess is located a removable threaded cover 263. The valve plug assembly 270 employs a disc-like plug 271. This has the usual type of stem 272 with the upper part extending through the perforation or opening 21 in the cap and this is provided with a finger grip end 273 located in the cap 263. The lower part 274 of the stem extends downwardly through the hub 255 and at the bottom has a screw threaded recess 275.

The vibratory weight assembly designated 280 employs a cylindrical weight 281, this preferably being flat on the bottom and top and having a plurality of deep recesses 282 and from the bottom of each recess there is a central bore 283 leading to the lower surface 284, the upper surface being indicated by the numeral 285. There are three of these recesses shown to obtain an even suspension of the weight. Therefore three suspension wires are utilized, each being similar and designated by the numeral 290. Each wire has its upper end 291 threaded in a recess in a lower partition 292 through which there is the opening 293. Each wire extends downwardly through the recess 282 and through the bore 283 and has an adjusting nut 294 threaded on its lower end. The depth of the recesses are the same and as the upper and lower surfaces of the weight are preferably parallel, the length of the bores 283 are likewise the same for all of the wires and as the wires have a snug fit in these bores, the points of oscillation are between the threaded ends 291 and the bottom of the recesses 282. This allows relatively long wires for a compact position of the weight in reference to the valve housing. The nuts 294 allow accurate adjustment of the weight to position its center of gravity vertically in line with the axis of the valve stem 274.

The contact assembly 300 employs a stud 301. This has a screw threaded plug 302 threaded in a recess 303 in the axial center of the weight. A nut head 304 may be used to tighten such stud in the recesses. The rod portion 305 of the stud extends upwardly and has a surfaced top face 306 ground at right angles to the axis of the stud.

A stemmed pin 310 has a screw threaded plug 311 threaded into the recess 275 on the lower part of the valve stem 274. This pin also has a wrench grip head 312 and a pin rod 313. This rod has its lower end surface 314 accurately ground and transverse to the axis of the pin. The stud and the pin are properly adjusted by adjusting the pendulum wires to obtain a face to face contact. The stud therefore supports the valve stem and the valve plug with this latter in the elevated or open valve position. The friction between the ends of the pin portion of the stem and the stud connected to the weight provides a damping action as to vibrations of the pendulum. A cover skirt 320 has a screw threaded connection 321 to the valve housing and is provided with a closure end 322 with wrench grip lugs 323 for tightening in place and forming a gas tight closure for the valve assembly and enclosing the weight.

Figure 13:
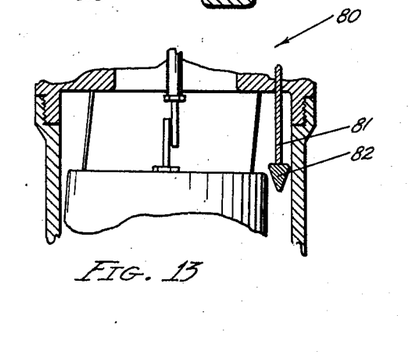
Fig. 13 is a section showing the weight in elevation and the displacement head in position to shift the weight for manual displacement.

In the operation of this vibratory weight, when the valve is subjected to any vibrations except those that are practically directly vertical, the inertia of the weight when the valve housing moves will cause a slight displacement of the stud in reference to the pin portion of the stem of the valve. However the damping action of the two contact ends materially resists a free motion of the weight. However when the jolt or shock is sufficiently severe the weight swings laterally to one side as shown in Fig. 13. In this movement there is practically a travel in a horizontal plane of the upper end 306 of the stud 305 on account of the multiple point suspension of the weight. Of course on a decided swing there would be a slight lifting of the stud but nevertheless as soon as the stud releases the pin of the stem the valve plug drops by gravity thus closing the valve.

In this construction of valve I employ a displacement device similar to that designated by the numeral 80 and shown in detail in Fig. 3. Normally the head 82 is elevated above the top of the weight when the valve is in the open position and when it is desired to manually open the valve, the rod 81 is displaced in any suitable manner thus causing the cone shaped head to displace the weight laterally to such a position as shown in Fig. 13, this causing the release of a valve plug and a closure of the valve. The arrangement may be used for a remote control of the valve by manual action much the same as described in connection with Figs. 1, 2 and 3.

In the construction of Fig. 14 I present an illustration of a device other than a valve controlled by the displaceable pendulum. This drawing shows the connection with a tri-filar pendulum 350 having a mounting quite similar to that shown in connection with Fig. 10 in which the pendulum weight 351 is suspended by three wires or filaments 352 form a fixed supporting structure 353. A stud or adjusting pin 354 is secured axially to the pendulum weight and extends vertically upwardly. In normal rest conditions this supports an actuating weight assembly 360 which includes a relatively heavy weight 361 having a stem 362 extending downwardly. This passes through a hub 363 in the supporting structure 350 and for convenience of air circulation the hub may be supported by a spider construction 364. The pin end 365 of the stem contacts the stud or pin 354 of the pendulum.

In this construction an electric circuit opener and/or closer is illustrated designated by the assembly numeral 370. This assembly employs an electrically insulated rod 371 or the like extending upwardly from the weight 361 and in axial alignment with the stem 362, this rod having a head 372. A fixed and insulated support 373 has a conducting resilient and bowed tongue 374 mounted thereon, this having an eye or opening 375 through which the rod 371 extends. A contact end 376 is adapted to engage a first contact arm 377 supported on an insulating bracket 378 to form a normally closed circuit. A second contact arm 379 is located below the first arm and mounted on an insulating bracket 380. Electric leads are connected to the arms 377 and 379 and to the tongue 374. In the action of this device as above mentioned, one circuit is normally closed, then when the pendulum is displaced, the weight 361 being unsupported drops downwardly, the head 372 gives a quick releasing action on the tongue opening the circuit at the arm 377 and closing the circuit at the arm 379.

In the construction of Fig. 15 I show substantially the same assembly as in Fig. 14. In this case however the rod 371 does not need to be insulated. A lever 390 is pivoted on a support 391. One end of the lever has an eye 392 through which the rod 370 extends. An operating wire 393 is connected to the lever and the tension lever is normally balanced so that the wire leading to some device to be controlled is substantially tight but not sufficient to pull the device controlled by the wire. In this construction when the pendulum weight is displaced by an earth shock, the weight 361 drops, thus causing the head 372 to engage the lever and rock this lever producing a pull on the control wire 393 which wire may be utilized to control or actuate any suitable type of mechanism. At present such wires are frequently used to control electric switches, such control being quite common in the electrical equipment for operating large printing presses but in such control the wire is intended to be manually operated should there be an earth shock which would be damaging to the presses, especially if they were in operation at the time of an earthquake.

In this specification I have not given any sizes or dimensions or the weights of the various pendulums in reference to the structures released thereby due to the vibration of the pendulums. For instance, considerating the valve or other assemblies using the tri-filar pendulum, the size and type of surface of the contact ends of the studs and the stem together with the weight of the pendulum in relation to the weight on the stem has a great influence on the damping action of the pendulum when the supporting structure of the valve or other device is subject to earth shocks. These are matters in the actual design to be estimated by scientists and engineers familiar with the various phenomena of earthquakes and earth movements. However, with my construction for use in valves or the like I may simplify the number of different sizes to be made. For instance, with one proportion of weights and sizes of contact between the studs and the stems I may cover a range of valves from ¾ inch to 1½ inch. Then with another proportion, I may use these on valves from say 2 inches to 4 inches. For larger size valves it may be necessary to proportion the weights and the contact friction surfaces for each individual size.

Various changes may be made in the details of the construction without departing from the spirit or scope of the invention as defined by the appended claims.

I claim:

1. In a device as described, a fixed supporting structure, a pendulum of a tri-filar type including a relatively heavy weight and a plurality of suspension means for the weight connected to the fixed structure, a device having means engaging an element connected to the pendulum weight and normally retained thereby in a first position, the weight being adapted to be displaced due to its inertia due to a movement of the supporting structure resulting from an earth shock, the said element when displaced releasing the means from its first position to have a free movement to a second position.

2. In a device as described, a fixed supporting structure, a pendulum of a tri-filar type having a relatively heavy weight and a plurality of suspension means connected from the weight to the fixed structure, a stud mounted on the weight having an upper horizontal surface, a device having a pin-like rod with an end to end contact with the horizontal end of the stud, the said stud holding the said device in an inactive position when the pendulum weight is in the normal rest position, the pendulum weight being adapted due to its inertia to be displaced due to an earth shock and movement to the supporting structure and thereby disengage the said stud and the pin, the said device being mounted to move to a second position when so released.

3. In a device as described, a supporting structure, a pendulum including a relatively heavy weight and relatively light suspension wires, the weight having recesses extending from its upper surface downwardly, the lower end of the wires being connected adjacent the bottom of the said recesses and their upper ends being connected to the supporting structure, a stud secured to the weight and having a top horizontal surface in vertical alignment with the center of gravity of the weight, the said suspension of the weight being such that such surface always remains horizontal when the supporting structure is not displaced, a device including a weight and a stem, a vertical guide for the stem, the stem having a pin with a bottom horizontal surface to contact the upper end of the stud and be aligned therewith, the weight therefore when at rest through the contact of the stud and pin, retaining the said weighted device in an upper position, the pendulum weight being adapted to develop a vibratory motion due to its inertia when the supporting structure is subject to earth vibrations, the contact ends of the stud and pin having friction contact surfaces developing a resistance to the vibration of the pendulum weight, however on increased displacement the stud being adapted to free itself from the pin and the stem and the pin being then free to move by gravity to a second position.

4. In a device as described, a supporting structure having a tri-filar type of pendulum including a weight with recesses and a plurality of suspension wires, the upper ends of said wires being secured to the supporting structure, the wires extending into the recess and being secured to the weight, the weight having a removable stud with a circular upper horizontal end surface, the suspension wires being proportioned in oscillation of the pendulum to maintain the said end surface always horizontal, a weighted stem mounted for vertical sliding movement and having a pin on its lower end, said pin having a circular contact lower end with a horizontal surface complementary to the upper end surface of the stud, the two surfaces being adapted to contact when the pendulum is at rest, the said pendulum due to its inertia being subject to vibration on a sudden displacement of the supporting structure and the contact surfaces being such as to develop a damping action for minor vibrations of the pendulum weight.

5. In a device as described, the combination of a rigid structure, a tri-filar pendulum suspended from said structure, the pendulum having a weight of great magnitude compared with the tri-filar suspension means, a device slidably mounted in the said structure, the pendulum and the device having complementary relatively small area contact horizontal surfaces normally in contact thereby retaining the said device in a first normal position, the structure and the pendulum having the further characteristics of an earth shock the said structure being displaced laterally relative to the pendulum due to the inertia of such pendulum thereby producing a friction and damping action between the two friction surfaces, the two surfaces having the further characteristic on a major earth shock of being entirely disengaged thereby releasing the said device for movement and means to urge said device from its first normal position to a second emergency position.

6. In a device as described, the combination of a relatively rigid structure, a pendulum having a weight and a connecting means supporting the weight from the said rigid structure, the mass of the weight being great compared with the mass of the connecting means, a stud extending upwardly from the weight, a device slidably mounted in the said structure and having a depending pin, the upper end of the stud and the lower end of the pin having complementary friction surfaces normally in contact whereby the said device is retained in a first normal position, the said rigid structure with the slidable device and the weight of the pendulum being relatively displaceable laterally on an earth shock, the area of the contact surfaces being characterized to disengage by substantially a horizontal relative movement of the stud and the pin and on a negligible vertical lift of the stud in the oscillation and displacement of the pendulum, the said surfaces having the further characteristic of developing a friction damping the relative oscillation of the stud and the pin in minor earth shocks but causing a release and disengagement of the said surfaces on a major earth shock and means to urge the said slidable device downwardly on the complete release of the complementary surfaces of the stud and the pin.

7. In a device as described, the combination of a relatively rigid structure, a pendulum having a weight and a connecting means between the weight and the rigid structure in which the mass of the weight is large compared with the mass of the connecting means, a stud extending above the weight, a device slidably mounted in the said rigid structure and having a depending pin, the stud and the pin having complementary engaging surfaces, the surface of the stud and the characteristics of the pendulum being such that such surface of the stud moves substantially in a horizontal plane with negligible vertical movement on the oscillation of the pendulum relative to the rigid structure to disengage the complementary surfaces of the stud and the pin and means to urge the said device downwardly from its normal first position on release of the stud and the pin to a second emergency position.

8. In a device as described, the combination of a relatively rigid structure, a tri-filar pendulum having a weight suspended by three equal length suspension means from the said rigid structure, the pendulum having a weight of great mass compared with the mass of the suspension means, a stud connected to the weight and extending upwardly provided with an upper surface in vertical alignment with the center of gravity of the weight, a device slidably mounted in the said structure and having a depending pin with a surface complementary whereby the stud and the pin retain the said device in a first normal position, the said surfaces having an area and the stud and the pin a cross sectional size whereby on relative oscillation of the weight and the rigid structure, the said surface of the stud moves substantially in a horizontal plane, the vertical lift being negligible to release the stud and the pin and means to urge the said device on release of the stud and pin from its first normal position to a second emergency position.

9. In a device as described, the combination of a relatively rigid structure, an inverted pendulum including a rod having its lower end rigidly attached to the rigid structure and a weight secured to the upper portion of the rod, the mass of the weight being great compared with the mass of the rod, a stud connected to the weight and extending upwardly provided with an upper surface, such surface and the connection of the rod to the pendulum being substantially in vertical alignment with the center of gravity of the weight, a device slidably mounted in the said structure and having a depending pin with a surface complementary to that of the stud and normally in contact therewith whereby the stud and pin retain the said device in a first normal position, the said complementary surfaces having the characteristic that on a minor earth shock and relative oscillation of the rigid structure and the weight a damping friction develops restraining the displacement of the two surfaces but on a major earth shock on increased relative oscillation, the said surfaces disengage and thereby release the pin from the stud and means to urge the said device on release of the stud and pin from its first normal to a second emergency position.

RICHARD E. BRANDON.